United States Patent [19]

Dixit et al.

[11] 4,399,243

[45] Aug. 16, 1983

[54] CLEANER AND SCRATCH REMOVER COMPOSITION

[75] Inventors: Sunit S. Dixit, Naperville; Daniel C. Thomas, Melrose Park, both of Ill.

[73] Assignee: Richardson Graphics Company, Des Plaines, Ill.

[21] Appl. No.: 215,816

[22] Filed: Dec. 12, 1980

[51] Int. Cl.[3] .......................... B41M 1/06; C09D 3/20; C09D 5/20; C08L 5/00

[52] U.S. Cl. .......................................... 524/55; 524/115; 524/296; 524/501; 101/450.1; 101/463.1; 430/949; 106/8; 106/14.5; 106/210

[58] Field of Search .................... 260/17.4 ST, 23 ST, 260/23 H, 27 R, 28.5 R, 31.8 M, 31.6, 334; 106/8, 10, 14.5, 210; 101/450.1, 451, 463.1; 430/949; 524/55, 115, 296, 315, 501

[56] References Cited

U.S. PATENT DOCUMENTS 2,865,873 12/1958 Hodgins et al. ............ 260/17.4 ST
3,759,850 9/1973 Lehman ....................... 260/17.4 ST
4,162,920 7/1979 Gillich ................................ 101/465
4,238,279 12/1980 Tsubai et al. ....................... 101/451
4,253,999 3/1981 Okishi .......................... 260/17.4 ST

*Primary Examiner*—John Kight, III
*Assistant Examiner*—Nathan M. Nutter
*Attorney, Agent, or Firm*—Lockwood, Dewey, Alex & Cummings

[57] ABSTRACT

A composition is provided which cleans, conditions, removes scratches, and finishes lithographic plates, the composition being an emulsion of an aqueous phase in an oil phase, the oil phase including a highly penetrating solvent such as mineral spirits, an oleophilic acid, and an emulsifying surfactant such as a non-ionic benzene sulfonate, while the aqueous phase includes a hydrophilic synthetic desensitizer such as a modified polyacrylamide, a gum desensitizer, a desensitizing agent such as phosphoric acid or derivatives thereof, a nitrate salt, and water. These compositions perform as plate cleaners, conditioners and scratch removers when put to use in the press room, and also are typically suitable for use as finishers for exposed and developed plates within the plate making room.

26 Claims, No Drawings

CLEANER AND SCRATCH REMOVER COMPOSITION

BACKGROUND AND DESCRIPTION OF THE INVENTION

The present invention generally relates to compositions for cleaning exposed lithographic plates, more particularly to improved emulsion compositions containing a specific combination of compounds which, when combined in admixture at particular relative concentrations are suitable for use as a finisher for imaged lithographic plates before they are run on the press while at the same time being useful as a superior plate cleaner and scratch remover for use within the press room in order to extend the overall useful life of an exposed and imaged printing plate as used during printing operations. Such compositions are multifunctional in that they provide in a single formulation the functions of removing ink from the image areas, desensitizing the non-image areas, reducing scumming and the appearance of scratches, and enhancing the oleophilic nature of the image areas, while at the same time not attacking the image areas.

Lithographic plate finishers of the emulsion type are well known from publications such as U.S. Pat. No. 4,162,920 as being useful for desensitizing the non-image areas of a lithographic printing plate while simultaneously conditioning the image areas of the plate to maintain the ink-receptivity thereof during storage, but such finishers typically require a subsequent plate roll-up of fifty cycles or more, whereby fifty or more preliminary printings that are of unacceptable quality must be completed before the plate is suitable for commercially acceptable printing. Also known heretofore are various other formulations that can be used as cleaners for plates that have become scummed, scratched or otherwise reduced in quality, which cleaners must be used in conjunction with a preliminary step of either first running the press dry, i.e. with the ink supply cut off, or first treating the plate with a non-aqueous solution, either of which preliminary steps must be then followed by a roll-up run on the order of thirty copies prior to actual application of the scratch remover. Both such prior art finishers and cleaners or scratch removers suffer the disadvantage of requiring wasteful lengthy roll-up, as well as the need to provide one formulation for finishing and another formulation for cleaning or scratch removal.

Accordingly, there has been brought about a need for a composition that is multifunctional in that it is suitable for finishing in association with plate making operations without requiring subsequent lengthy roll-up while at the same time also be a superior one-step cleaner and scratch remover for use in the press room that does not require a preliminary cleaning step necessitating wasteful plate cleaning pre-printing runs. By the present invention, a single composition is provided which is suitable for use as a plate finisher as well as a plate cleaner, either such use being one in which such superior results are accomplished without any extensive roll-up being required. The compositions of the present invention are emulsions of an oil phase and of an aqueous phase, the oil phase including an oleophilic acid, a highly penetrating solvent, and a surfactant for emulsifying the oil phase and the aqueous phase together. The aqueous phase includes a hydrophilic synthetic resin desensitizer, a gum desensitizer, a desensitizing agent of phosphoric acid and/or derivatives thereof, an alkaline nitrate salt, and water, the compounds of the emulsion being combined in particularly advantageous relative ratios to bring about the superior multifunctional attributes of this invention.

It is, therefore, a general object of the present invention to provide an improved cleaning composition.

Another object of this invention is to provide an improved cleaner and finisher that works effectively on virtually any lithographic printing plate, whether it be subtractive, additive, or wipe on.

Another object of this invention is to provide an improved multifunctional composition for treating lithographic printing plates while substantially reducing use of paper, ink, and the additional roll-up runs required to achieve commercially acceptable printing quality.

Another object of the present invention is to provide an improved emulsion composition that performs both as a finisher in the plate making room and also as a superior cleaner, conditioner or scratch remover in the press room.

Another object of the present invention is to provide a plate treating composition that is easy to apply and has a uniform, easy-to-handle consistency and that does not cake up when it passes through restricted areas such as necks of bottles.

Another object of this invention is an improved composition of various compounds in admixture that are compatible with each other at selected ratio ranges and which composition desensitizes and keeps the non-image areas of exposed plates hydrophilic on storage, renders the image areas more oleophilic, removes ink off of the plate on the press, and eliminates the printing of scratches on the non-image areas, including any minor scratches that are made during mounting and handling of the plates.

Another object of the present invention is to provide a superior water-in-oil emulsion having an aqueous phase for desensitizing non-image areas and an oil phase that removes oil receptive contamination from fingerprints, skin oils, hair oils, ink, or other sources.

Another object of this invention is to provide an improved composition that desensitizes and removes ink from non-image areas of exposed lithographic plates while restoring ink receptivity and insuring excellent fast image ink-up characteristics.

Another object of this invention is an improved plate cleaner that does not always require gumming after water washing it from the cleaned plate.

These and other objects of the present invention will be more apparent from the following further detailed description thereof.

The emulsion compositions in accordance with this invention include an oil phase of a highly penetrating solvent, an oleophilic acid, and an emulsifying surfactant, and an aqueous phase having a hydrophilic synthetic desensitizer, a gum desensitizer, phosphoric acid and/or derivatives thereof as a desensitizing agent, an alkaline nitrate salt, and water, optionally also including a polyol to assist in keeping the emulsion stable. An important aspect of this invention is the relative ratio of these various ingredients within the composition to provide a water-in-oil emulsion that accomplishes a multitude of functions without any significant interference among the various individual components thereof.

Emulsions according to this invention comprise the following quantities of compounds, each quantity being expressed as a weight percent based upon the total weight of the emulsion composition; the relative ratios of such compounds being within these values:

| COMPOUNDS | RANGE | PREFERRED RANGE | MOST PREFERRED RANGE |
|---|---|---|---|
| (Oil Phase) | | | |
| Highly penetrating solvent | 7–23% | 10–20% | 13–17% |
| Oleophilic acid | 0–15% | 5–10% | 7–8% |
| Emulsifying surfactant | 4–20% | 5–15% | 8–12% |
| (Aqueous Phase) | | | |
| Hydrophilic synthetic desensitizer | 0.05–0.5% | 0.1–0.3% | 0.15–0.25% |
| Gum desensitizer | 10–28% | 12–25% | 17–23% |
| Phosphate desensitizing agent | 0.1%–2.5% | 0.2–2% | 0.5–1.5% |
| Nitrate salt | 0.2–7% | 0.5–5% | 1–3% |
| Polyol emulsion stabilizer (optional) | 1–20% | 2–10% | 2.5–7.5% |
| Water | 25–70% | 32–45% | 38–42% |

The highly penetrating solvent included within the oil phase of the emulsion composition according to this invention must be one that has penetration properties that are of a strength that is capable of removing ink off of plates in the press room while at the same time not being overly penetrating so as to damage the image or non-image areas even when the formulation remains on the plate for extended periods of time such as when it is used as a finisher. Suitable solvents include mineral spirits, kerosene and lithotene (approximately 90 percent mineral spirits and 10 percent of an oleophilic resin), the preferred penetrating solvent being mineral spirits. It is preferred to maintain the mineral spirits content of the composition to as low a level as possible in order to minimize the tendency of the water-in-oil emulsion to break up during shelf storage. When an especially stable emulsion is desired the mineral spirits content should be not much greater than about 15 weight percent, based on the total weight of the composition.

An oleophilic acid is preferably included within the oil phase as a compound that is particularly advantageous in the emulsions according to this invention in ordr to make the image areas of the exposed and developed plates more oleophilic while at the same time being of assistance in stabilizing the emulsion. Especially preferred in this regard is oleic acid, although similar compounds such as stearic acid are suitable in some formulations according to this invention. If enhanced ink receptivity is not needed, the oleophilic acid can be omitted, provided the emulsifying surfactant has especially strong emulsifying properties, such as the isoactyl phenoxy polyethoxy ethanols.

Emulsifying surfactants within the oil phase must be adequate to assist in forming and to maintain the water-in-oil emulsion of this invention, preferably to the extent that phase separation is substantially eliminated for several months when the emulsion is on the shelf and stands undisturbed. Such surfactants may be either non-ionic, anionic or cationic, although cationic surfactants typically will not be used because they tend to disintegrate at the low pH values of these compositions. Non-ionic surfactants are generally preferred because they are themselves particularly stable within the very acidic environment of these compositions. Surfactants of this type include isoactyl phenoxy polyethoxy ethanols such as Triton N-57 of Rohm and Haas Company, non-ionic N-substituted fatty acid amides having polyoxythylene substituents, such as Ethomid 0/15 of Armour, a polyethylene glycol p-isoactylphenyl ether such as Igepal 630 of GAF Corporation, mixtures of sodium salts of sulfated fatty alcohols, including surfactants such as Duponal WAQ and Duponal ME of DuPont Corporation, long chain alcohol ethylene oxide condensates such as Merpol MC of DuPont Corporation, modified alkanol amides such as Richamide 6445 of The Richardson Company, and benzene sulfonate non-ionic surfactants. Especially preferred are the alkyl substituted benzene sulfonates, such as isopropylamine dodecyl benzene sulfonate, which have a superior ability to stabilize the emulsions according to this invention for extended periods of time, the use of other surfactants typically necessitating having to agitate the composition in order to reform a complete emulsion prior to use of the composition. The stability of the emulsion is further enhanced when the surfactant is not much less than 10 weight percent of the entire composition.

The hydrophilic synthetic resin desensitizer within the aqueous phase must, of course, be water soluble, typically being a hydrolyzed synthetic resin such as modified polyacrylamides, hydrolyzed styrene-maleic anhydride copolymers, hydrolyzed vinyl ether-maleic anhydride copolymers, and the like. Especially preferred is a modified polyacrylamide having a molecular weight of approximately 200,000 in which about 70% of the acrylamide groups thereof have been hydrolyzed to acrylic acid groups, such material being in the nature of a 70/30 copolymer of sodium acrylate and acrylamide, typically being provided as a 10% solution. Preferably, for solubility purposes, these hydrophilic synthetic desensitizers will be in the generally alkaline salt form.

Gum desensitizers useful within the aqueous phase of this invention may be either natural or synthetic, a readily available and most acceptable gum desensitizer being gum arabic, such as 14° Be gum arabic. The gum desensitizer, when in admixture, with the hydrophilic synthetic desensitizer and the phosphoric desensitizing agent, brings about an especially advantageous desensitization of the plate on the press as well as maintenance of the hydrophilic character of the non-image areas while they are stored.

The phosphoric desensitizing agent, which works in admixture with the resin desensitizer and the gum desensitizer to swell the gum molecule in order, for example, to increase the water receptivity of the gum, also assists in maintaining the low pH of the overall emulsion system, typically between about 1.70 and 2.20 and preferably about 1.80. Such phosphoric desensitizing agent includes phosphoric acid or derivatives thereof, phosphoric acid itself typically being preferred.

Also included within the aqueous phase is an alkaline scratch eliminator, such as a nitrate salt, which is water soluble and functions to desensitize scratches on the non-image areas to the extent that the scratch will not accept the ink when the plate is printed. Especially useful scratch eliminators are magnesium nitrate, potassium nitrate, and the like.

An optional ingredient within the aqueous phase is a polyol emulsion stabilizer that is useful in reducing the need to agitate the composition prior to use in order to re-form the emulsion between the oil phase and the aqueous phase. Polyglycols have generally been found to be acceptable, and glycerine is the preferred polyol emulsion stabilizer. Carbowax materials are also useful in this regard, but are inferior.

The hydrophilic synthetic resin, the gum desensitizer and the phosphoric desensitizing agent, are especially advantageous in that they cooperate to provide a desensitizing composition that not only renders the non-image area oleophobic or hydrophilic during storage and serves to desensitize the plate on the press, but it also is compatible with the other components within the aqueous phase such as the nitrate salt scratch remover as well as with each of the compounds of the oil phase, especially the oleic acid oleophilic agent for the image area and the highly penetrating solvent press ink remover. It is this intercompatibility among the various ingredients of the emulsion composition at the specific relative ratios thereof that is an important aspect of this invention which enables the overall composition to be simultaneously multifunctional.

Compositions according to this invention clean ink from printing plates as used on the press without damaging the image areas, at the same time being suitable both to protect the non-image areas of the exposed and developed plate while in storage and to remove surface scratches therefrom. They desensitize the plate non-image background areas, protect the plate in storage, and condition the image areas to maintain them oleophilic, all while avoiding scumming on the plates. They have a viscosity on the order of about 68 to 77 centipoises, a specific gravity of about 0.998±0.009, a tag closed cup flash point at about 175°-185° F., and have the appearance of a white emulsion.

In use, the compositions according to this invention are applied to an imaged lithographic printing plate. When used as a cleaner, they are applied to at least the affected areas of the plate with a damp sponge or a Webril wipe, after which they are left on the plate for at least 30 seconds, and then the surface is wiped clean or the plate is etched with a fountain solution, gum or water. At this stage, the plate is ready to be run on the press.

The following specific examples will more precisely illustrate this invention and teach the presently preferred procedures for practicing the same, as well as the advantages and improvements realized thereby.

EXAMPLE 1

Various compositions were prepared as reported in the Table herein. Of these 46 compositions, the one identified as Run No. 46 most clearly exhibited all of the properties in accordance with this invention. Acceptable, but not as completely possessive of all of these properties, was Run No. 45. Slightly less acceptable was Run No. 36, and of marginal acceptability was Run No. 25. In general, each of the other compositions would not clean up the non-image areas adequately without extensive hand rubbing of the plate and/or without damaging the image areas, did not adequately protect the non-image areas, exhibited a viscosity that was too low or too high for optimum workability, did not enhance the ink receptivity of the image areas to the same advantageous degree, tended to blind the plates treated therewith, did not roll-up as fast and/or the emulsion separated on storage for 72 hours or less at ambient conditions.

TABLE

| | AQUEOUS PHASE | | | | OIL PHASE | | |
|---|---|---|---|---|---|---|---|
| RUN No. | WATER | DESENSITIZER SYSTEM | SCRATCH REMOVER | EMULSION STABILIZER | PENETRATING SOLVENT(S) | OLEOPHILIC AGENT | EMULSION SURFACTANT(S) |
| 1 | 42% | 10% Gum Arabic<br>0.2% Polyacrylamide*<br>1% Phosphoric acid | — | — | 43% Mineral Spirits | — | 3% Richamide<br>1% Ethomid |
| 2 | 24% | 5% Gum Arabic<br>0.2% Polyacrylamide<br>1% Phosphoric acid | 5% Magnesium Nitrate | — | 70% Butyl Cellosolve | — | — |
| 3 | 37% | 10% Gum Arabic<br>0.2% Polyacrylamide<br>1% Phosphoric acid<br>2% Sodium Silicate | — | — | 35% Mineral Spirits<br>1% Pine Oil | — | 14% Richamide |
| 4 | 37% | 10% Gum Arabic<br>0.2% Polyacylamide<br>1% Phosphoric acid<br>2% Sodium Silicate | — | — | 35% Lithotene<br>1% Pine Oil | — | 14% Richamide |
| 5 | 37% | 10% Gum Arabic<br>0.2% Polyacrylamide<br>1% Phosphoric acid<br>2% Sodium Silicate | — | — | 35% Kerosene<br>1% Pine Oil | — | 14% Richamide |
| 6 | 42% | 10% Gum Arabic<br>0.2% Polyacrylamide | 2% Magnesium Nitrate | — | 40% Mineral Spirits | — | 2% Richamide |

TABLE-continued

| | | AQUEOUS PHASE | | | OIL PHASE | | |
|---|---|---|---|---|---|---|---|
| RUN No. | WATER | DESENSITIZER SYSTEM | SCRATCH REMOVER | EMULSION STABILIZER | PENETRATING SOLVENT(S) | OLEOPHILIC AGENT | EMULSION SURFACTANT(S) |
| | | 1% Phosphoric Acid | | | 1% | Pine Oil | |
| 7 | 42% | 2% Sodium Silicate<br>10% Gum Arabic<br>0.2 Polyacrylamide<br>1% Phosphoric acid | 2% Magnesium Nitrate | — | 40% SC-150<br>1% Pine Oil | — | 2% Richamide |
| 8 | 42% | 2% Sodium Silicate<br>10% Gum Arabic<br>0.2% Polyacrylamide<br>1% Phosphoric acid | 2% Magnesium Nitrate | — | 40% Kerosene<br>1% Pine Oil | — | 2% Richamide |
| 9 | 42% | 2% Sodium silicate<br>10% Gum Arabic<br>0.2% Polyacrylamide<br>1% Phosphoric acid | 2% Magnesium Nitrate | — | 40% Mineral Spirits<br>1% Pine Oil | — | 2% Igepal |
| 10 | 42% | 2% Sodium silicate<br>10% Gum Arabic<br>0.2% Polyacrylamide<br>1% Phosphoric acid | 2% Magnesium Nitrate | — | 40% Mineral Spirits<br>1% Pine Oil | — | 2% Triton |
| 11 | 44% | 2% Sodium silicate<br>10% Gum Arabic<br>0.2% Polyacrylamide<br>1% Phosphoric acid | 2% Magnesium Nitrate | — | 40% Mineral Spirits<br>1% Pine Oil | — | 2% Triton |
| 12 | 42% | 10% Gum Arabic<br>0.2% Polyacrylamide<br>1% Phosphoric acid | 2% Magnesium Nitrate | 2% Carbowax | 40% Mineral Spirits<br>1% Pine Oil | — | 2% Triton |
| 13 | 42% | 10% Gum Arabic<br>0.2% Polyacrylamide<br>1% Phosphoric acid | 2% Magnesium Nitrate | 2% Carbowax | 40% Lithotene<br>1% | —<br>Pine Oil | 2% Triton |
| 14 | 42% | 10% Gum Arabic<br>0.2% Polyacrylamide<br>1% Phosphoric acid | 2% Magnesium Nitrate | 2% Carbowax | 40% Mineral Spirits<br>1% Pine Oil | — | 2% Triton |
| 15 | 42% | 10% Gum Arabic<br>0.2% Polyacrylamide<br>1% Phosphoric acid | 2% Magnesium Nitrate | 2% Glycerine | 40% Mineral Spirits<br>1% Pine Oil | — | 2% Triton |
| 16 | 41% | 10% Gum Arabic<br>0.2% Polyacrylamide<br>1% Phosphoric acid | 2% Magnesium Nitrate | 2% Glycerine | 39% Mineral Spirits<br>1% Pine Oil | — | 2% Triton |
| 17 | 41% | 2% Silanox<br>10% Gum Arabic<br>0.2% Polyacrylamide<br>1% Phosphoric acid | 2% Magnesium Nitrate | 2% Glycerine | 39% Mineral Spirits<br>1% Pine Oil | — | 2% Triton |
| 18 | 41% | 2% Cab-O-Sil<br>10% Gum Arabic<br>0.2% Polyacrylamide<br>1% Phosphoric acid | 2% Magnesium Nitrate | 2% Glycerine | 39% Mineral Spirits<br>1% Pine Oil | — | 2% Triton |
| 19 | 41% | 2% Carboxymethyl Cellulose<br>10% Gum Arabic<br>0.2% Polyacrylamide<br>1% Phosphoric acid | 2% Magnesium Nitrate | 5% Glycerine | 39% Mineral Spirits<br>1% Pine Oil | — | 2% Triton |
| 20 | 41% | 10% Gum Arabic<br>0.2% Polyacrylamide<br>1% Phosphoric acid | 2% Magnesium Nitrate | 2% Glycrine | 39% Mineral Spirits<br>1% Pine Oil | — | 5% Triton |
| 21 | 34% | 10% Gum Arabic<br>0.2% Polyacrylamide<br>1% Phosphoric acid | 2% Magnesium Nitrate | 10% Glycerine | 40% Mineral Spirits<br>1% Pine Oil | — | 2% Triton |
| 22 | 24% | 10% Gum Arabic<br>0.2% Polyacrylamide<br>1% Phosphoric acid | 2% Magnesium Nitrate | 20% Glycerine | 40% Mineral Spirits<br>1% Pine Oil | — | 2% Triton |

TABLE-continued

| | | AQUEOUS PHASE | | | OIL PHASE | | |
|---|---|---|---|---|---|---|---|
| RUN No. | WATER | DESENSITIZER SYSTEM | SCRATCH REMOVER | EMULSION STABILIZER | PENETRATING SOLVENT(S) | OLEOPHILIC AGENT | EMULSION SURFACTANT(S) |
| 23 | 29% | 10% Gum Arabic<br>0.2% Polyacrylamide<br>1% Phosphoric acid | 2% Magnesium Nitrate | 20% Glycerine | 40% Mineral Spirits<br>1% Pine Oil | — | 2% Triton |
| 24 | 31% | 10% Gum Arabic<br>0.1% Polyacrylamide<br>1% Phosphoric acid | 2% Magnesium Nitrate | 5% Glycerine | 40% Mineral Spirits<br>1% Pine Oil | — | 2% Triton |
| 25 | 59% | 10% Gum Arabic<br>0.2% Polyacrylamide<br>1% Phosphoric acid | 2% Magnesium Nitrate | 5% Glycerine | 20% Mineral Spirits<br>1% Pine Oil | — | 2% Triton |
| 26 | 69% | 10% Gum Arabic<br>0.2% Polyacrylamide<br>1% Phosphoric acid | 2% Magnesium Nitrate | 5% Glycerine | 10% Mineral Spirits<br>1% Pine Oil | — | 2% Triton |
| 27 | 64% | 10% Gum Arabic<br>0.2% Polyacrylamide<br>1% Phosphoric acid | 2% Magnesium Nitrate | 5% Glycerine | 15% Mineral Spirits<br>1% Pine Oil | — | 2% Triton |
| 28 | 59% | 10% Gum Arabic<br>0.2% Polyacrylamide<br>1% Phosporic acid | 2% Magnesium Nitrate | 5% Glycerine | 18% Mineral Spirits<br>1% Pine Oil | — | 2% Triton<br>2% Duponal WAQ |
| 29 | 59% | 10% Gum Arabic<br>0.2% Polyacrylamide<br>1% Phosphoric acid | 2% Magnesium Nitrate | 5% Glycerine | 18% Mineral Spirits<br>1% Pine Oil | — | 2% Triton<br>2% Duponal ME |
| 30 | 59% | 10% Gum Arabic<br>0.2% Polyacrylamide<br>1% Phosphoric acid | 2% Magnesium Nitrate | 5% Glycerine | 18% Mineral Spirits<br>1% Pine Oil | — | 2% Triton<br>2% Merpol |
| 31 | 56% | 10% Gum Arabic<br>0.2% Polyacrylamide<br>1% Phosphoric acid | 2% Magnesium Nitrate | 5% Glycerine | 20% Mineral Spirits<br>1% Pine Oil | — | 5% Substituted benzene sulfonate** |
| 32 | 60% | 10% Gum Arabic<br>0.2% Polyacrylamide<br>1% Phosphoric acid | 2% Magnesium Nitrate | 5% Glycerine | 20% Mineral Spirits<br>1% Pine Oil | — | 1% Triton |
| 33 | 51% | 10% Gum Arabic<br>0.2% Polyacrylamide<br>1% Phosphoric acid | 2% Magnesium Nitrate | 5% Glycerine | 20% Mineral Spirits<br>1% Pine Oil | — | 10% Substituted benzene sulfonate |
| 34 | 46% | 10% Gum Arabic<br>0.2% Polyacrylamide<br>1% Phosphoric acid | 2% Magnesium Nitrate | 5% Glycerine | 20% Mineral Spirits<br>1% Pine Oil | — | 15% Substituted benzene sulfonate |
| 35 | 46% | 10% Gum Arabic<br>0.2% Polyacrylamide<br>1% Phosphoric acid | 2% Magnesium Nitrate | 5% Glycerine | 20% Mineral Spirits<br>1% Pine Oil | 5% Stearic acid | 10% Substituted benzene sulfonate |
| 36 | 45% | 10% Gum Arabic<br>0.2% Polyacrylamide<br>1% Phosphoric acid | 2% Magnesium Nitrate | 5% Glycerine | 20% Mineral Spirits | 8% Stearic acid | 10% Substituted benzene sulfonate |
| 37 | 47% | 10% Gum Arabic<br>0.2% Polyacrylamide<br>1% Phosphoric acid | 2% Magnesium Nitrate | 5% Glycerine | 20% Mineral Spirits | 5% Oleic acid | 10% Substituted benzene sulfonate |
| 38 | 44.3% | 10% Gum Arabic<br>0.2% Polyacrylamide<br>1% Phosphoric acid | 2% Magnesium Nitrate | 5% Glycerine | 20% Mineral Spirits | 7.5% Oleic acid | 10% Substituted benzene sulfonate |
| 39 | 42% | 10% Gum Arabic<br>0.2% Polyacrylamide<br>1% Phosphoric acid | 2% Magnesium Nitrate | 5% Glycerine | 20% Mineral Spirits | 10% Oleic acid | 10% Substituted benzene sulfonate |
| 40 | 50% | 10% Gum Arabic<br>0.2% Polyacrylamide<br>1% Phosphoric acid | 2% Magnesium Nitrate | 5% Glycerine | 20% Mineral Spirits | 10% Oleic acid | — |
| 41 | 42% | 10% Gum Arabic<br>0.2% Polyacrylamide<br>1% Phosphoric acid | 2% Magnesium Nitrate | 5% Glycerine | 20% Mineral Spirits | 5% Oleic acid | 15% Substituted benzene sulfonate |
| 42 | 37% | 20% Gum Arabic | 2% Magnesium | 5% Glycerine | 20% Mineral | 5% Oleic | 10% Substituted |

TABLE-continued

| | | AQUEOUS PHASE | | | OIL PHASE | | |
|---|---|---|---|---|---|---|---|
| RUN No. | WATER | DESENSITIZER SYSTEM | SCRATCH REMOVER | EMULSION STABILIZER | PENETRATING SOLVENT(S) | OLEOPHILIC AGENT | EMULSION SURFACTANT(S) |
| | | 0.2% Polyacrylamide<br>1% Phosphoric acid | Nitrate | | Spirits | acid | benzene sulfonate |
| 43 | 41% | 20% Gum Arabic<br>0.2% Polyacrylamide<br>1% Phosphoric acid | 2% Magnesium Nitrate | 5% Glycerine | 15% Mineral Spirits<br>1% Pine Oil | 5% Oleic acid | 10% Substituted benzene sulfonate |
| 44 | 41% | 20% Gum Arabic<br>0.2% Polyacrylamide<br>1% Phosphoric acid | 2% Magnesium Nitrate | 5% Glycerine | 15% Litho Asphaltum<br>1% Pine Oil | 5% Oleic acid | 10% Substituted benzene sulfonate |
| 45 | 41.5% | 20% Gum Arabic<br>0.45% Polyacrylamide<br>1% Phosphoric acid | 2% Magnesium Nitrate | 5% Glycerine | 15% Mineral Spirits | 5% Oleic acid | 10% Substituted benzene sulfonate |
| 46 | 39.3% | 20% Gum Arabic<br>0.2% Polyacrylamide<br>1% Phosphoric acid | 2% Magnesium Nitrate | 5% Glycerine | 15% Mineral Spirits | 7.5% Oleic acid | 10% Substituted benzene sulfonate |

*70% hydrolyzed
**Isopropylamine Dodecyl Benzene Sulfonate Non-Ionic Surfactant

EXAMPLE 2

A liberal amount of the composition of Run No. 46 of the Table was applied to 3-R plates having a cinnamoylated polymer layer over a diazonium material layer (Richardson Graphics Company) during a press run with a damp sponge and worked gently into the plates, was left to stand on the plates for at least 30 seconds, after which the plates were wiped clean, re-etched as necessary, and the press run was continued. By this procedure, the composition was found to be effective to remove scum caused by the following faulty press conditions: dirty dampners, roller bounce, excessive plate or blanket packing, excessive form roller pressure on the plate, improper form roller, rider roller or Dahlgren roller durometer setting, low alcohol content in the dampening solution, a fountain solution that is too acidic or too alkaline, insufficient gum in the fountain solution, a fountain additive that is incompatible with the rest of the system, excessive ink feed, emulsified ink, incompatible low tack and/or greasy ink, leaching of chemicals out of the paper affecting the pH of the fountain solution, and using blanket and/or roller washes or other press chemicals so that they contact the plate either directly or indirectly.

EXAMPLE 3

The ink removing capabilities of the composition of Run No. 46 of the Table were evaluated by running roll-up tests on plates after they were run in the press room and after they were treated with the Run No. 46 composition, Azoplate plate cleaner, 3M plate cleaner, and Kodak plate cleaner. Only the composition according to this invention achieved commercially acceptable printing quality after not more than 5 roll-up cycles, with the other plate cleaners requiring about 50 to 60 cycles to achieve commercially acceptable print quality.

EXAMPLE 4

Scum prevention capabilities of the Run No. 46 composition were evaluated by making comparison runs using Enco FPC, Kodak plate cleaner, Polychrome 257 plate cleaner and the Run No. 46 composition to treat 3-R plates. The Enco product was found to scum the plate, the Kodak product was observed to remove the image from the plate, the Polychrome product did not clean acceptably and when applied in order to remove scratches the plate become blinded, and the composition according to this invention successfully removed scratches without evidence of scumming or blinding.

EXAMPLE 5

The versatility of the compositions according to this invention was evaluated by using same on various exposed and developed lithographic printing plates, with the result that the compositions worked well as a cleaner/scratch remover/desensitizer on all additive (S-30, S-130, S-56) and all subtractive (3-R) plates of Richardson Graphics Company, on 3M-XN subtractive plates, on Kodak LNL subtractive plates, and on Enco N-200 subtractive plates. By contrast, Polychrome 257 plate cleaner required hard rubbing to remove scum on these plates, Kodak plate cleaner worked well on the Kodak LNL plates but not on any of the other plates, the "R" plate cleaner of 3M worked adequately on the 3M-XN plates but not on the other plates, and the Enco FPC composition was found to work well on the Enco N-200 plates but not on any of the others.

The foregoing examples are offered to illustrate the composition according to this invention. They are not intended to limit the general scope of this invention in strict adherence thereto; accordingly, the invention is to be construed and limited only by the scope of the appended claims.

We claim:

1. A multifunctional cleaner, scratch remover, conditioner and finisher composition for treating imaged and developed lithographic plates, said composition being an emulsion of an oil phase and an aqueous phase comprising a water-in-oil emulsion including:

an oil phase including between about 13 and 17 weight percent of a highly penetrating solvent selected from the group consisting of mineral spirits, kerosene and lithotene, between about 5 and 10 weight percent of an oleophilic acid, between about 4 and 20 weight percent of an emulsifying surfactant, all based on the total weight of the emulsion composition; and an aqueous phase including between about 0.05 and 0.5 weight percent of a hydrophilic synthetic resin desensitizer, between about 10 and 28 weight percent of a gum desensitizer, between about 0.1 and 2.5 weight percent of a desensitizing agent of phosphoric acid or derivatives thereof, between about 0.2 and 7 weight percent of an alkaline nitrate salt, and between about 32 and 45 weight percent water, all based upon the total weight of the emulsion composition.

2. The multifunctional composition of claim 1, wherein said aqueous phase further includes between about 1 and 20 weight percent of a polyol emulsion stabilizer, based upon the total weight of the emulsion composition.

3. The multifunctional composition of claim 1, wherein said emulsion includes between about 13 and 17 weight percent of the highly penetrating solvent, between about 5 and 10 weight percent of said oleophilic acid, between about 5 and 15 weight percent of the emulsifying surfactant, between about 0.1 and 0.3 weight percent of synthetic resin desensitizer, between about 12 and 25 weight percent of the gum desensitizer, between about 0.2 and 2 weight percent of the phosphoric desensitizing agent, between about 0.5 and 5 weight percent of the nitrate salt, and between about 32 and 45 weight percent water.

4. The multifunctional composition of claim 1, wherein said emulsion includes between about 13 and 17 weight percent of the highly penetrating solvent, between about 7 and 8 weight percent of said oleophilic acid, between about 8 and 12 weight percent of the emulsifying surfactant, between about 0.15 and 0.25 weight percent of the synthetic resin desensitizer, between about 17 and 23 weight percent of the gum desensitizer, between about 0.5 and 1.5 weight percent of the phosphoric desensitizing agent, between about 1 and 3 weight percent of the nitrate salt, and between about 38 and 42 weight percent water.

5. The multifunctional composition of claim 1, wherein said highly penetrating solvent is mineral spirits.

6. The multifunctional composition of claim 1, wherein said emulsifying surfactant is a non-ionic surfactant.

7. The multifunctional composition of claim 1, wherein said emulsifying surfactant is an alkyl substituted benzene sulfonate.

8. The multifunctional composition of claim 1, wherein said emulsifying surfactant is isopropylamine dodecyl sulfonate.

9. The multifunctional composition of claim 1, wherein said hydrophilic synthetic resin desensitizer is selected from the group consisting of modified polyacrylamides, hydrolyzed styrene-maleic anhydride copolymers, and hydrolyzed vinyl ether-maleic anhydride copolymers.

10. The multifunctional composition of claim 1, wherein said hydrophilic synthetic resin desensitizer is a modified polyacrylamide having approximately 70 percent of the acrylamide groups hydrolyzed to acrylic acid groups.

11. The multifunctional composition of claim 1, wherein said hydrophilic synthetic resin desensitizer is a 70/30 copolymer of sodium acrylate and acrylamide.

12. The multifunctional composition of claim 1, wherein said gum desensitizer is gum arabic.

13. The multifunctional composition of claim 1, wherein said desensitizing agent is phosphoric acid.

14. The multifunctional composition of claim 1, wherein said scratch eliminator is magnesium nitrate or potassium nitrate.

15. The multifunctional composition of claim 1, wherein said scratch eliminator is magnesium nitrate.

16. The multifunctional composition of claim 1, wherein said emulsion composition has a pH of between about 1.70 and 2.20.

17. The multifunctional composition of claim 2, wherein said emulsion includes between about 2 and 10 weight percent of said polyol, based on the total weight of the emulsion composition.

18. The multifunctional composition of claim 2, wherein said emulsion includes between about 2.5 and 7.5 weight percent of said polyol, based on the total weight of the emulsion composition.

19. The multifunctional composition of claim 2, wherein said polyol is a polyglycol.

20. The multifunctional composition of claim 2, wherein said polyol is glycerine.

21. The multifunctional composition of claim 1, wherein said emulsifying surfactant is an isoactyl phenoxy phenylethoxy ethanol.

22. The multifunctional composition of claim 1, wherein said oleophilic acid is oleic acid or stearic acid.

23. The multifunctional composition of claim 1, wherein said oleophilic acid is oleic acid.

24. A multifunctional cleaner, scratch remover, conditioner and finisher composition for treating imaged and developed lithographic plates, said composition comprising a water-in-oil emulsion including, in admixture:

an oil phase including between about 13 and 17 weight percent of mineral spirits, between about 5 and 10 weight percent of oleic acid, and between about 5 and 15 weight percent of an alkyl substituted benzene sulfonate surfactant; and an aqueous phase including between about 0.1 and 0.5 weight percent of a modified polyacrylamide hydrophilic synthetic resin desensitizer, between about 12 and 25 weight percent of a natural gum desensitizer, between about 0.2 and 2 weight percent of phosphoric acid, between about 0.5 and 5 weight percent of an alkaline nitrate salt, and between about 32 and 45 weight percent of water, all percentages being based on the total weight of the emulsion composition.

25. The multifunctional composition of claim 24, wherein said emulsion includes between about 13 and 17 weight percent of said mineral spirits, between about 7 and 8 weight percent of said oleic acid, between about 8 and 12 weight percent of said surfactant, between about 0.15 and 0.3 weight percent of said modified polyacrylamide, between about 17 and 23 weight percent of said natural gum, between about 0.5 and 1.5 weight percent of said phosphoric acid, between about 1 and 3 weight percent of said nitrate salt, and between about 38 and 42 weight percent of said water, all based on the total weight of the emulsion composition.

26. A method of providing a composition for cleaning, removing scratches and conditioning imaged, developed and inked lithographic plates while simultaneously providing a composition for finishing and conditioning imaged and developed lithographic plates, comprising a water-in-oil emulsion including:

preparing an oil phase including between about 13 and 17 weight percent of a highly penetrating solvent selected from the group consisting of mineral spirits, kerosene and lithotene, between about 5 and 10 weight percent of an oleophilic acid, and between about 4 and 20 weight percent of an emulsifying surfactant, all based on the total weight of the composition;

preparing an aqueous phase including between about 0.05 and 0.5 weight percent of a hydrophilic synthetic resin desensitizer, between about 10 and 28 weight percent of a gum desensitizer, between about 0.1 and 2.5 weight percent of a desensitizing agent of phosphoric acid or derivatives thereof, between about 0.2 and 7 weight percent of an alkaline nitrate salt, and between about 32 and 45 weight percent water, all based on the total weight of the composition; and forming a water-in-oil emulsion composition from said oil phase and said aqueous phase.

* * * * *

UNITED STATES PATENT AND TRADEMARK OFFICE

CERTIFICATE OF CORRECTION

PATENT NO. : 4,399,243

DATED : August 16, 1983

INVENTOR(S) : Sunit S. Dixit and Daniel C. Thomas

It is certified that error appears in the above-identified patent and that said Letters Patent are hereby corrected as shown below:

At Column 3, line 47, "ordr" should read --order--.

At Column 4, line 3, "polyoxythylene" should read --polyoxyethylene--.

At Column 8, lines 3-4, --1% Pine Oil-- should appear in the column entitled "Penetrating Solvent(s)" and "Pine Oil" should be deleted in the column entitled "Oleophilic Agent".

At Column 8, lines 14-15, --1% Pine Oil-- should appear in the column entitled "Penetrating Solvent(s)" and "Pine Oil" should be deleted in the column entitled "Oleophilic Agent".

At Column 16, line 9, a new paragraph should begin after "and".

Signed and Sealed this

*Sixth* Day of *December 1983*

[SEAL]

*Attest:*

GERALD J. MOSSINGHOFF

*Attesting Officer* *Commissioner of Patents and Trademarks*